United States Patent
Yamada et al.

[15] 3,686,350
[45] Aug. 22, 1972

[54] PROCESS FOR DIMERIZATION OR CO-DIMERIZATION OF α-OLEFIN

[72] Inventors: Isao Ono; Shizuo Yamada; Hiroyuki Abe; Kazuo Tago; Nobuko Kunihiro, all of No. 4560, Oaza-Tonda, Nanyo-cho, Tasuno-gun Yamaguchi, Japan

[22] Filed: June 1, 1970

[21] Appl. No.: 42,590

[30] Foreign Application Priority Data

May 29, 1969 Japan............................44/42012
Jan. 14, 1970 Japan............................45/3990

[52] U.S. Cl..260/683.15 D, 252/431 P, 260/94.9 CB
[51] Int. Cl.................................................C07c 3/10
[58] Field of Search.............................260/683.15 D

[56] References Cited

UNITED STATES PATENTS

| | | | |
|---|---|---|---|
| 3,379,706 | 4/1968 | Wilke | 260/683.15 X |
| 3,564,071 | 2/1971 | Izawa et al. | 260/683.15 |
| 3,576,902 | 4/1971 | Bearden et al. | 260/683.15 |

*Primary Examiner*—Paul M. Coughlan, Jr.
*Attorney*—Sughrue, Rothwell, Mion, Zinn & Macpeak

[57] ABSTRACT

A process in which an α-olefin is dimerized or co-dimerized in the presence of a ternary catalyst consisting of (a) an alkyl-aluminum compound, (b) at least one titanate selected from the group consisting of the tetra-alkyl-titanates or tetra-phenyl-titanates and (c) an organic phosphorus compound is disclosed.

13 Claims, No Drawings

PROCESS FOR DIMERIZATION OR CO-DIMERIZATION OF α-OLEFIN

BACKGROUND OF THE INVENTION

1. Field of the Invention

This invention relates to a method of dimerization or co-dimerization of α-olefin. More particularly, this invention relates to a method of dimerization or co-dimerization of α-olefins.

2. Description of the Prior art

Hitherto, numerous research on synthesing n-butene has been done, particularly in the production of n-butene by dimerizing ethylene; a considerable number of patents and reports are known. However, a method of dimerization has not been established.

On the other hand, α-olefins having five to six carbons, including 3-methyl-butene-1 and 4-methyl-pentene-1, are industrially useful derivatives, and accordingly numerous studies in the field of dimerization or co-dimerazation of ethylene, propylene and n-butene are reported. However, olefins with many carbon atoms have many isomers, and the dimers or the co-dimers formed often contain isomers. Presently, a process for the selective synthesis of α-olefins by dimerization or co-dimerization is not available.

In these circumstances, the present invention made a search for catalyst for dimerizing or co-dimerizing α-olefin including dimerization catalyst of ethylene.

But, as has already been mentioned in preceding Japanese Patent 5067/57, a small quantity of solid polymer forms in the dimerization of ethylene in spite of good catalytic activity and selectivity. It is reported that such solid polymer may hinder continuous dimerization.

Polymers formed in a dimerization process are a fibrous substance of small bulk density which will wrap in catalyst liquid, prevent its contact with ethylene and may result in reducing its catalytic activity. Also, it is considered that the formation of solid polymer will make operating for a long period of time impossible. Moreover, the formation of solid polymer is undesirable in dimerizing or co-dimerizing other α-olefins.

SUMMARY OF THE INVENTION

After laborious research, the inventors have found a catalyst system having conspicuous characteristics which will initiate the dimerization of ethylene relatively readily under moderate conditions and moreover having selectivity for 1-butene, and having the ability for suppressing the formation of solid polymers. MOreover, in case of dimerization or co-dimerization of other α-olefins, these catalysts are capable of suppressing the formation of solid polymers.

The method of dimerization or co-dimerization of α-olefins comprises contacting an α-olefin with a ternary catalyst consisting of (A) at least one alkyl-aluminum compound selected from the group consisting of $R_3Al$ and $R_2AlH$ wherein R is an alkyl radical, (B) at least one titanate selected from the group consisting of $Ti(OAr)_4$ and $Ti(OR')_4$, wherein Ar is an aryl radical and R' is a lower alkyl radical, and (C) at least one organic phosphorus compound selected from the group consisting of $(R^1Z)(R^2Z)(R^3Z)P$, $R^1R^2R^3P$ and mixtures thereof wherein each of $R^1$, $R^2$ and $R^3$ is selected from the group consisting of a hydrogen atom, an alkyl, an aryl, and alkyl-aryl, an aralkyl radical, and derivatives thereof, and wherein Z is selected from the group consisting of oxygen and sulfur atoms.

DETAILED DESCRIPTION OF THE INVENTION

In one embodiment of the invention, ternary constituents (A), (B) and (C) are an alkyl-aluminum compound (A), at least one titanate selected from the group consisting of tetra-alkyl-titanates and tetra-aryl-titanates (B), and an organic phosphorus compound (C), respectively. To the catalysts obtained by contacting the ternary components, either directly or in the presence of a suitable solvent, at ordinary temperatures or below 150° C under atmosphere pressure, or at reduced pressure, ethylene or propylene or a gas mixture of ethylene-propylene are brought into contact to effect the dimerization or the co-dimerization to produce n-butene, in particular, 1-butene selectively. In this case, it is characteristic that the polymer formed during the dimerization reaction is of the high bulk density type suspended in the catalyst liquid, and does not get wrapped in the liquid. In addition, the amount of polymer formation is very small.

The alkyl-aluminum compounds used as the (A) constituent are compounds represented by the general formula $R_3Al$ or $R_2AlH$, wherein R is an alkyl radical having from two to six carbon atoms in which an aluminum atom and organic carbon atoms are combined in a molecule.

The tetra alkyl-titanates or tetra-aryl-titanates used as the (B) constituent are compounds represented by a formula $Ti(OR')_4$, wherein R is a lower alkyl radical having from one to eight carbon atoms, or $Ti(OAr)_4$, wherein Ar is a phenyl radical or a substituted phenyl radical and wherein the substituted phenyl radical is an alkyl phenyl, a halogenated phenyl, a nitrophenyl, an aryl phenyl or one of their derivatives respectively. These compounds can by synthesized by the method disclosed by Yoshino, J. Chem. Soc. of Japan Ind. Sec.,60,1,124–1,125, (1957).

The organic phosphorus compounds used as the (c) constituent are phosphite type compounds, represented by the general formula $(R^1Z)(R^2Z)(R^3Z)P$, or phosphine type compounds, represented by the general formula $R^1R^2R^3P$, wherein each of $R^1$, $R^2$ and $R^3$ in both formulas is a hydrogen atom or an alkyl, an aryl, an alkyl-aryl or an aralkyl radical or one of their derivatives, and Z is oxygen or sulfur atom.

More specifically, suitable examples of organic phosphorus compounds used as the (C) constituent are trimethyl phosphite, triethyl phosphite, triisopropyl phosphite, tributyl phosphite, tridecyl phosphite, triphenyl phosphite, tricresyl phosphite, dilaurylphenyl phosphite, diphenyldecyl phosphite, trilauryl-trithio phosphite, 2phosphite, phenyl-dilauryl-dithio phosphite, diphenyl-hydrogen phosphite, dibutyl-hydrogen phosphite, as phosphite compounds, and/or triphenyl phosphine, tricresyl phosphine, trioctyl phosphine, as phosphine compounds. Also, as alkyl ester types or aryl ester types of phosphine compounds, monethyl-diethoxy phosphine, phenyl-diethoxy phosphine, etc., can be obviously used.

Further, the constituents (A), (B), and (C) are not limited to the use of one constituent, but, if desired, two or more of them can be used as a mixture which is to be considered within the scope of this invention.

In accordance with this invention, catalysts of ingredients (A), (B) and (C) show excellent catalytic activity. The molar ratio of (A)/(B) above 1.0 is suitable. If the (A)/(B) ratio is less than 1.0, formation of catalyst cannot be carried out satisfactorily, and catalyst will show low activity, and if the molar ratio of (A)/(B) is greater than 20, solid polymers are formed, and at the same time the dimerizing or co-dimerizing activity and the yield of dimers per catalyst tends to decrease and the process becomes unpractical.

The molar ratio (C)/(B) of constituents C and B can be as desired, but in the case of a (C)/(B) less than 0.1, formation of solid polymers can be suppressed, while in the case of a (C)/(B) greater than 20, though suppression of polymer formation is sufficiently possible, the dimerization or co-dimerization activity does not particularly increase.

Next, as for concentration of the catalyst, 1 m. mol of the titanium compound per liter or higher is suitable. If the concentration is less than 1 m. mol/l, deactivation of the catalyst occurs and the reproducibility of dimerization or co-dimerization decreases rapidly.

Although the reaction of $\alpha$-olefin can proceed at from -10° to 150° C at the lower temperatures, the reaction velocity is so low that it is not practical, and at higher temperatures, due to the dimerization of the catalyst system, they display less activity. The preferable reaction temperature is in the range of from 30° to 80° C.

Moreover, suitable solvents such as aliphatic, aromatic and alicyclic hydrocarbons, such as heptane, toluene and cyclo-hexane can be used. The reaction proceeds either at reduced pressure or at atmospheric pressure. Especially at reduced pressure, the formation of dimers or co-dimers increases.

The catalytic system used in this invention, as is demonstrated in the following examples, has comparatively high activity, and at the same time, the selectivity of the $\alpha$-olefin is fairly good. In particular, the formation of 1-butene in the n-butene process is very high. Moreover, the addition of the organic phosphorous compound will enhance the dimerization or co-dimerization activity and reduce the formation of polymers, which is a characteristic advantage in contrast to the situation which exists without the organic phosphorus compound. In the case of dimerization or co-dimerization of an $\alpha$-olefin with other catalytic systems, the content of the $\alpha$-olefins in the final products is less than several per cent in many cases. At present the theoretical explanation of the effect of the added organic phosphorus compounds is not understood.

In the following, the invention is explained further by reference to the following examples, but this invention is in no way to be limited thereby.

EXAMPLES 1–21

The catalyst was prepared in a 200 ml autoclave with an electromagnetic stirrer in a nitrogen filled dry box. 0.8 m. mol of the titanium compound shown in Table 1 was weighed in, and a calculated quantity of an n-heptane solution of the alkyl-aluminum shown in Table 1 was added, then a calculated quantity of the organic phosphorous compound shown in Table 1 was added. N-heptane was further added until the total volume reached 80 ml. The three component catalyst system thus obtained was ripened for 30 minutes at the reaction temperature and then ethylene was added. The system was kept at a constant pressure, and the reaction was carried out for a definite period of time. After that, the autoclave was cooled to a temperature of $-60°$ C and the products in the reaction vessel were discharged through a trap previously cooled with a carbon dioxide - methanol solution. Further, by heating the reaction solution, the low-boiling substances consisting mainly of n-butene were collected in the same trap.

High boiling substances consisting mainly of hexene in the reaction solution were respectively separated, and analyzed by means of gas chromatography. Further solid polymers were washed with hydrochloric methanol solution, dried and weighed. The results are shown in Table 1 below.

COMPARISON EXAMPLES 1–2.

Using the same process as described in Examples 1 – 21, the results of the reaction of ethylene with a catalyst consisting of alkyl aluminum and titanium compounds are shown in the same way in Table 1.

TABLE 1

| Ex. No. | Alkyl aluminum compound | Titanium compound (note 1) | Organic phosphorus compound | Al/Ti ratio | P/Ti ratio | Pressure Kg/cm²G | Temp. °C | Time min. | Butene (note 2) g | Polymer g |
|---|---|---|---|---|---|---|---|---|---|---|
| 1 | Et₃Al | p-Buᵗ PhTi | (EtO)₃P | 5.5 | 0.5 | 15 | 0 | 30 | 5.1 | 0.04 |
| 2 | Et₃Al | p-Me PhTi | (EtO)₃P | 5.5 | 0.5 | 5 | 30 | 30 | 5.0 | 0.08 |
| 3 | Et₂Al H | p-Am PhTi | (EtO)₃P | 15.0 | 7.0 | 15 | 60 | 30 | 38.0 | 0.10 |
| 4 | Et₃Al | p-Buᵗ PhTi | (MeO)₃P | 7.4 | 4.0 | 15 | 60 | 30 | 23.2 | 0.02 |
| 5 | Et₃Al | p-Buᵗ PhTi | (EtO)₃P | 7.4 | 4.0 | 15 | 60 | 30 | 40.9 | 0.05 |
| 6 | Et₃Al | p-Buᵗ PhTi | (EtO)₃P | 8.2 | 4.0 | 15 | 60 | 40 | 54.1 | 0.07 |
| 7 | Et₃Al | p-Buᵗ PhTi | (EtO)₃P | 8.2 | 6.0 | 15 | 60 | 40 | 58.6 | 0.05 |
| 8 | Et₃Al | p-Amᵗ PhTi | (PrⁱO)₃P | 7.4 | 4.0 | 15 | 60 | 30 | 39.3 | 0.14 |
| 9 | Et₃Al | p-Amᵗ PhTi | (Buⁿ O)₃P | 7.4 | 4.0 | 15 | 60 | 30 | 42.6 | 0.07 |
| 10 | Et₃Al | p-Me PhTi | (Decyl-O)₃P | 7.4 | 4.0 | 15 | 60 | 30 | 53.4 | 0.09*1 |
| 11 | Et₃Al | p-Buᵗ PhTi | (PhO)₃P | 6.5 | 1.0 | 15 | 60 | 40 | 38.0 | 0.49 |
| 12 | Pr₃Al | m-Buᵗ PhTi | (PhO)₂P(O&Decyl) | 7.3 | 3.0 | 15 | 60 | 30 | 18.0 | 0.12 |
| 13 | (C₆H₁₃)₃Al | p-Buᵗ PhTi | (PhO)P(O-Lauryl)₂ | 7.4 | 4.0 | 15 | 75 | 30 | 25.0 | 0.08 |
| 14 | Et₃Al | p-Buᵗ PhTi | (C₁₂H₂₅S)₃P | 5.5 | 0.5 | 15 | 60 | 30 | 21.0 | 0.23 |
| 15 | Et₃Al | p-Buᵗ PhTi | (2Et-Hexyl-O)₃P | 6.0 | 2.0 | 10 | 40 | 30 | 10.5 | 0.10*1 |
| 16 | Et₃Al | p-Buᵗ PhTi | (C₁₂H₂₅S)₂P(OPh) | 5.0 | 0.5 | 15 | 70 | 30 | 20.0 | 0.15 |
| 17 | Et₃Al | p-Buᵗ PhTi | (Oleyl-O)₃P | 6.0 | 2.0 | 25 | 60 | 30 | 51.2 | 0.05 |
| 18 | Et₃Al | p-Buᵗ PhTi | (BuO)₂POH | 5.5 | 0.5 | 15 | 60 | 30 | 25.9 | 0.28*2 |
| 19 | Et₃Al | p-Buᵗ PhTi | (PhO)₂P OH | 5.5 | 0.5 | 15 | 60 | 30 | 21.1 | 0.42 |
| 20 | Et₃Al | p-Buᵗ PhTi | Ph₃P | 6.0 | 3.0 | 15 | 60 | 30 | 30.9 | 1.01 |
| 21 | Et₃Al | p-Buᵗ PhTi | EtP(OEt)₂ | 7.4 | 4.0 | 15 | 60 | 30 | 35.0 | 0.90 |

Comparative Example 1

| | | | | | | | | | |
|---|---|---|---|---|---|---|---|---|---|
| Et$_3$Al | p-Bu$^t$ PhTi | — | 5.5 | 0 | 15 | 60 | 30 | 21.3 | 3.12 |

Comparative Example 2

| | | | | | | | | | |
|---|---|---|---|---|---|---|---|---|---|
| Et$_3$Al | p-Bu$^t$ PhTi | — | 4.5 | 0 | 15 | 60 | 30 | 37.2 | 1.20 |

(Note 1):
Titanium compound: 0.78 – 0.82 m. mol was used.

(Note 2)
The content of 1-butene in the formed n-butene is over 99 percent.

*1: (A) component added after the addition of component (B) to component (C).
*2: (B) component added after the addition of component (A) to component (C).

The alkyl aluminum compounds, titanium compounds and organic phosphorus compounds used correspond to the following compounds respectively.

1. Alkyl Aluminum Compounds.
Et$_3$Al: Triethyl Aluminum
Et$_2$AlH: Diethyl Aluminum Hydride
Bu$_3$Al: Tributyl Aluminum
Pr$_3^n$Al: Tri-n-propyl Aluminum
(C$_6$H$_{13}$)$_3$Al: Trihexyl Aluminum 2. Titanium Compounds.
PhTi: Phenyl Titanate: Ti(OPh)$_4$
P-MePhTi: para-Methyl-phenyl Titanate
P-Bu$^t$PhTi: para-tertiaryButyl-phenyl Titanate
P-Am$^t$PhTi: para-tertiaryAmyl-phenyl Titanate
m-Bu$^t$PhTi: meta-tertiaryButyl-phenyl Titanate
p-Bu$^s$PhTi: para-secondaryButyl-phenyl Titanate
Bu$_4$Ti: Butyl Titanate
Pr$_4^i$Ti: Isopropyl Titanate
Et$_4$Ti: Ethyl Titanate 3. Phosphorus Compounds.
(MePhO)$_3$P: Tricresyl Phosphite
(EtO)$_3$P: Triethyl phosphite
(MeO)$_3$P: Trimethyl Phosphite
(Pr$^i$O)$_3$P: Triisopropyl Phosphite
(BU$^n$O)$_3$P: Tri-n-butyl Phosphite
(Decyl-O)$_3$P: Tridecyl Phosphite
(PhO)$_3$P: Triphenyl Phosphite
(PhO)$_2$P(O-Decyl): Diphenyl Decyl Phosphite
(PhO)P(O-Lauryl)$_2$: Dilauryl Phenyl Phosphite
(C$_{12}$H$_{25}$S)$_3$P: Trilauryl-trithio phosphite
2Et-Hexyl-O)$_3$P: Tri(2-ethyl-hexyl) Phosphite
(C$_{12}$H$_{25}$S)$_2$P(OPh): Phenyl-dilauryl-dithio phosphite
(Oleyl-O)$_3$P: Trioleyl Phosphite
(Bu$^n$O)$_2$POH: Di-n-butyl Phosphite
(PhO)$_2$POH: Di-phenyl Phosphite
Ph$_3$P: Triphenyl Phosphine
EtP(OEt)$_2$: Monoethyl Diethoxy Phosphine

EXAMPLES 22 – 24.

In the same manner as described in Examples 1 –21, the catalyst solution was charged into the autoclave. The autoclave was cooled to a temperature of 0° C and into it propylene was added. Then the autoclave was placed in a water bath maintained at the reaction temperature and was left a prescribed period of time to complete the reaction. After the reaction was completed, unreacted propylene and dimers were separated from the residue and analyzed by means of gas chromatography. The results are shown in Table 2.

TABLE 2

| Example | Alkyl aluminum compound | Titanium compound $^1$ | Organic phosphorus compound | Al/Ti ratio | P/Ti ratio | Pressure, kg./cm.$^2$g. | Temperature, °C. | Time, hrs. | Butene, g. | Pentene, g. | Hexene, g. $^2$ |
|---|---|---|---|---|---|---|---|---|---|---|---|
| 22 | Et$_3$Al | PhTi | (BuO)$_3$P | 6 | 3 | 16 | 60 | 4 | Trace | Trace | 1.2 |
| 23 | Et$_3$Al | P-Bu$^t$ PhTi | (PhO)$_3$P | 6 | 2 | 16 | 60 | 5 | ...do... | ...do... | 1.0 |
| 34 | Bu$_3$Al | PhTi | Ph$_3$P | 6 | 3 | 16 | 60 | 2 | ...do... | ...do... | 1.0 |

$^1$ The titanium compound used was 1 m. mol:30 g. of propylene was used.
$^2$ Hexene composition:
4-methyl-1-pentene plus 3-methyl-1-pentene: ca. 20%.
4-methyl-2-pentene: ca. 40%.
2-methyl-p-pentene: ca. 11%.
Others: ca. 29%.

EXAMPLES 25 – 27.

In the same manner as described in Examples 22 – 24, the catalyst solution was charged into the autoclave. After the autoclave was cooled to a temperature of 0° C, the prescribed quantity of propylene was charged. The autoclave was kept in a water bath at the reaction temperature for 30 minutes. When the system attained constant pressure, additional ethylene was added to the system and the reaction carried out at a constant pressure for a prescribed period of time. After the reaction, by the same process as described in Examples 1 to 21, unreacted propylene, butenes, pentenes and hexenes were separated and analyzed by means of gas chromatography. The results are shown in Table 3.

TABLE 3

| Example | Alkyl aluminum compound | Titanium compound $^1$ | Organic phosphorus compound | Al/Ti ratio | P/Ti ratio | Pressure kg./cm.$^2$ g.$^4$ | Temp., °C. | Time, hr. | Butene$^3$, g. | Pentene, g. | Hexene$^2$, g. |
|---|---|---|---|---|---|---|---|---|---|---|---|
| 25 | Et$_3$Al | P-Bu$^t$PhTi | (EtO)$_3$P | 8 | 2 | 16+2 | 75 | 2 | 5.2 | 3.0 | 0.5 |
| 26 | Et$_3$Al | P-MePhTi | (Decyl-O)$_3$P | 8 | 2 | 16+2 | 75 | 2 | 7.0 | 5.0 | 0.2 |
| 27 | Et$_3$Al | P-Am$^t$PhTi | Ph$_3$P | 6 | 2 | 16+2 | 75 | 3 | 6.0 | 3.0 | 0.5 |

$^{1,2}$ Cf. Table 2.
$^3$ Pentene composition: 3-methyl-1-butene, 30–40%; 2-methyl-1-butene, 50–60%.
$^4$ Ethylene pressure 2 kg./cm.$^2$ g. added.

Note.—In an alkyl aluminum compound Ni Co system: α-olefin is several percent lower in dimers produced.

EXAMPLES 28 – 44

The catalyst was prepared in a 200 ml. autoclave with an electromagnetic stirrer in a nitrogen filled dry box. 1.0 m. mol of the titanium compound shown in Table 4 was weighed in, and calculated quantity of an n-heptane solution of the alkyl aluminum shown in Table 4 was added, then a calculated quantity of the organic phosphorus compound shown in Table 4 was added. Then n-heptane was additionally added until a total volume of 80 ml. was reached. The three component catalyst system thus obtained was ripened for 30 minutes and then ethylene was added. After the system was kept at a constant pressure, the reaction was carried out for a definite period of time. After that, the autoclave was cooled to a temperature of −60° C and the products in the reaction vessel were discharged through a trap previously cooled with a carbon dioxide - methanol solution. Further, by heating the reaction solution, the low boiling substances consisting mainly of n-butene were collected in the same trap. High boiling substances consisting mainly of hexene in the reaction solution were respectively separated and analyzed by means of gas chromatography. Further, the solid polymers were washed with a hydrochloric methanol solution and dried and weighed. The results are shown in Table 4.

COMPARISON EXAMPLE 3 – 4.

In the same process as described in Examples 28 – 44, the results of the reaction of ethylene with a catalyst consisting of alkyl aluminum and titanium compounds were obtained and are shown in Table 4.

EXAMPLES 45 – 47

In the same manner as described in Examples 28 – 44, the catalyst solution was charged into an autoclave. The autoclave was cooled to a temperature of 0° C and into it propylene was added. Then the autoclave was placed in a water bath maintained at the reaction temperature and was left a prescribed period of time to complete the reaction. After this, unreacted propylene and dimers were separated from the residue and analyzed by means of gas chromatography. The results are shown in Table 5.

EXAMPLES 48 – 50

In the same manner as described in Examples 28 – 44, the catalyst solution was charged into the autoclave. After the autoclave was cooled to a temperature of 0° C, the prescribed quantity of propylene was charged. The autoclave was kept in a water bath at the reaction temperature for 30 minutes when the pressure of the system attained constancy, additional ethylene was added to the system and the reaction carried out at constant pressure for the prescribed period of time. After the reaction, by the same process as described in Examples 28 – 44, unreacted propylene, butenes, pentenes and hexenes were separated and analyzed by means of gas chromatography. The results are shown in Table 6.

What is claimed is:

1. A process for the dimerization or co-dimerization of an α-olefin having from two to four carbon atoms, which comprises contacting said α-olefin with a catalyst consisting of
   A. at least one alkyl aluminum compound selected from the group consisting of $R_3Al$ and $R_2AlH$, wherein R is an alkyl radical having from two to six

TABLE 4

| Example | Alkyl aluminum compound | Titanium compound [1] | Organic phosphorus compound | Al/Ti ratio | P/Ti ratio | Pressure, kg./cm.² g. | Temp., °C. | Time, min. | Butene-1, g. | Relative quantity, percent [2] | Polymer, g. |
|---|---|---|---|---|---|---|---|---|---|---|---|
| 28 | $Et_3Al$ | $Bu_4Ti$ | $(MeO)_3P$ | 5.5 | 4.0 | 15 | 60 | 30 | 21.0 | 99.0 | 0.03 |
| 29 | $Et_3Al$ | $Bu_4Ti$ | $(EtO)_3P$ | 5.5 | 4.0 | 10 | 60 | 30 | 19.0 | 99.1 | 0.04 |
| 30 | $Et_3Al$ | $Bu_4Ti$ | $(Pr^iO)_3P$ | 5.5 | 4.0 | 5 | 30 | 30 | 13.0 | 98.2 | 0.15 |
| 31 | $Et_3Al$ | $Bu_4Ti$ | $(Bu^nO)_3P$ | 6.5 | 3.0 | 20 | 50 | 30 | 61.8 | 99.5 | 0.06 |
| 32 | $Et_3Al$ | $Bu_4Ti$ | $(2Et\text{-}hexyl\text{-}O)_3P$ | 6.0 | 2.0 | 10 | 40 | 30 | 15.3 | 98.0 | 0.10 |
| 33 | $Et_3Al$ | $Bu_4Ti$ | $(Decyl\text{-}O)_3P$ | 6.0 | 2.0 | 50 | 30 | 30 | 45.0 | 99.0 | 0.06 |
| 34 | $Et_3Al$ | $Et_4Ti$ | $(PhO)_3P$ | 6.0 | 1.0 | 5 | 50 | 30 | 26.1 | 99.4 | 0.22 |
| 35 | $Et_3Al$ | $Pr^i_4Ti$ | $(Oleyl\text{-}O)_3P$ | 7.4 | 4.0 | 15 | 60 | 30 | 40.0 | 98.0 | 0.09 |
| 36 | $Et_3Al$ | $Pr^i_4Ti$ | $(C_{12}H_{25}S)_3P$ | 5.5 | 0.5 | 15 | 60 | 30 | 21.0 | 99.0 | 0.72 |
| 37 | $Et_3Al$ | $Et_4Ti$ | $(Lauryl\text{-}S)_2P(OPh)_2$ | 5.0 | 0.5 | 15 | 70 | 30 | 20.0 | 99.1 | 0.15 |
| 38 | $Et_3Al$ | $Bu_4Ti$ | $(Decyl\text{-}O)_2p(OPh)_2$ | 7.5 | 3.0 | 15 | 60 | 30 | 17.0 | 99.0 | 0.10 |
| 39 | $Et_3Al$ | $Bu_4Ti$ | $(PhO)_2POH$ | 7.0 | 1.0 | 15 | 50 | 30 | 15.0 | 99.2 | 0.80 |
| 40 | $Et_3Al$ | $Bu_4Ti$ | $(Bu^nO)_2POH$ | 5.0 | 0.5 | 5 | 60 | 30 | 25.1 | 99.4 | 0.54 |
| 41 | $Pr^n_3Al$ | $Bu_4Ti$ | $(MePhO)_3P$ | 7.0 | 1.0 | 10 | 85 | 30 | 13.1 | 99.4 | 0.12 |
| 42 | $(C_6H_{13})_3Al$ | $Bu_4Ti$ | $Ph_3P$ | 5.0 | 1.0 | 5 | 50 | 30 | 17.4 | 94.5 | 0.94 |
| 43 | $Bu^i_3nAl$ | $Bu_4Ti$ | $(PhO)P(O\text{-}lauryl)_2$ | 5.0 | 0.5 | 15 | 70 | 30 | 21.5 | 98.9 | 0.20 |
| 44 | $Et_2AlH$ | $Bu_4Ti$ | $EtP(OEt)_2$ | 7.4 | 4.0 | 15 | 60 | 30 | 30.0 | 98.2 | 0.90 |
| Comparative Example 3. | $Et_3Al$ | $Bu_4Ti$ | | 5.0 | | 5 | 50 | 30 | 15.6 | 98.6 | 1.35 |
| Comparative Example 4. | $Et_3Al$ | $Bu_4Ti$ | | 5.0 | | 20 | 50 | 30 | 45.1 | 98.5 | 2.83 |

[1] Titanium compound: 0.8-1.0 m. mol is used.
[2] Relative quantity shows the content of 1-butene in the formed n-butene.

TABLE 5

| Example | Alkyl aluminium compound | Titanium compound [1] | Organic phosphorus compound | Al/Ti ratio | P/Ti ratio | Pressure kg./cm.² g. | Temp., °C. | Time, hr. | Butene, g. | Pentene, g. | Hexene, g.[2] |
|---|---|---|---|---|---|---|---|---|---|---|---|
| 45 | $Et_3Al$ | $Bu^n_4Ti$ | $(BuO)_3P$ | 6 | 4 | 16 | 60 | 4 | Trace | Trace | 1.5 |
| 46 | $Et_3Al$ | $Bu^n_4Ti$ | $(PhO)_3P$ | 6 | 4 | 16 | 60 | 3 | do | do | 1.2 |
| 47 | $Et_3Al$ | $Pr^i_4Ti$ | $Ph_3P$ | 6 | 4 | 16 | 75 | 2 | do | do | 1.0 |

[1] Titanium compound used was 1 mmol, 30 g. of propylene was used.
[2] Hexene composition: 4-methyl-1-pentene plus 3-methyl-1-pentene, ca. 20%; 4-methyl-2-pentene, ca. 40%; 2-methyl-1-pentene, ca. 11%; others, ca. 29%.

TABLE 6

| Example | Alkyl aluminium compound | Titanium compound [1] | Organic phosphorus compound | Al/Ti ratio | P/Ti ratio | Pressure kg./cm.² g. | Temp., °C. | Time, hr. | Butene, g. | Pentene, g.[3] | Hexene, g.[4] |
|---|---|---|---|---|---|---|---|---|---|---|---|
| 48 | $Et_3Al$ | $Bu^n_4Ti$ | $(EtO)_3P$ | 8 | 2 | 16+2 | 75 | 2 | 5.0 | 2.5 | 0.5 |
| 49 | $Et_3Al$ | $Bu^n_4Ti$ | $(Decyl\text{-}O)_3P$ | 8 | 2 | 16+2 | 75 | 2 | 6.5 | 5.0 | 0.2 |
| 50 | $Et_3Al$ | $Pr^i_4Ti$ | $Ph_3P$ | 6 | 2 | 16+2 | 75 | 2 | 5.5 | 3.0 | 0.5 |

[1] Titanium compound used was 1 mmol; 30 g. of propylene was used.
[2] Ethylene pressure: 2 kg./cm.² g. added.
[3] Pentene composition: 3-methyl-1-butene, ca. 30-40%; 2-methyl-1-butene, ca. 50-60%.
[4] Hexene composition: 4-methyl-1-pentene plus 3-methyl-1-pentene, ca. 20%; 4-methyl-2-pentene, ca. 40%; 2-methyl-1-pentene, 11%; others, 29%.

carbon atoms;

B. at least one titanate selected from the group consisting of Ti(OAR)$_4$ and (TiOR')$_4$, wherein Ar is an aryl radical having from six to 11 carbon atoms and R' is an alkyl radical having from one to eight carbon atoms, and C. at least one organic phosphorus compound selected from the group consisting of (R$^1$Z)(R$^2$Z)(R$^3$Z)P, R$^1$R$^2$R$^3$P and alkyl and aryl esters of said R$^1$R$^2$R$^3$P, wherein each of R$^1$, R$^2$ and R$^3$ is selected from the group consisting of a hydrogen atom, an alkyl, an aryl, an aralkyl and an alkyl-aryl radical, and Z is selected from the group consisting of an oxygen atom and a sulfur atom.

2. The process according to claim 1, wherein the molar ratio of the alkyl aluminum compound to the titanate ranges from 1.0 to 20.0.

3. The process according to claim 1, wherein the α-olefin is ethylene.

4. The process according to claim 1, wherein the α-olefin is propylene.

5. The process according to claim 1, wherein the α-olefin is a mixture of ethylene and propylene.

6. The process according to claim 1, wherein the reaction temperature ranges from −10° to 150°C.

7. The process according to claim 1, wherein the reaction temperature ranges from 30° to 80°C.

8. The process according to claim 1 wherein the titanate is Ti(OAr)$_4$.

9. The process according to claim 1, wherein the titanate is Ti(OR')$_4$.

10. The process according to claim 1 wherein the process is carried out in a solvent selected from the group consisting of aliphatic, aromatic and alicyclic hydrocarbons.

11. The process according to claim 1 wherein said organic phosphorus compound is selected from the group consisting of trimethyl phosphite, triethyl phosphite, tri-isopropyl phosphite, tributyl phosphite, tridecyl phosphite, triphenyl phosphite, trilauryl-trithio phosphite, 2-chloroethyl phosphite, phenyl-dilauryl-dithio phosphite, diphenyl-hydrogen phosphite, dibutyl-hydrogen phosphite, triphenyl phosphine, tricresyl phosphine and trioctyl phosphine.

12. A process according to claim 1 wherein molar ratio of said organic phosphorus compound to said titanate is in the range of 0.1 to 20.

13. A process for the dimerization or co-dimerization of an α-olefin having from two to four carbon atoms, which comprises contacting said α-olefin with a catalyst consisting essentially of A. at least one alkyl aluminum compound selected from the group consisting of R$_3$Al and R$_2$AlH, wherein R is an alkyl radical having from two to six carbon atoms;

B. at least one titanate selected from the group consisting of Ti(OAr)$_4$ and (TiOR')$_4$, wherein Ar is an aryl radical having from six to 11 carbon atoms and R' is an alkyl radical having from one to eight carbon atoms, and C. at least one organic phosphorus compound selected from the group consisting of (R$^1$Z)(R$^2$Z)(R$^3$Z)P, R$^1$R$^2$R$^3$P and alkyl and aryl esters of said R$^1$R$^2$R$^3$P, wherein each of R$^1$, R$^2$ and R$^3$ is selected from the group consisting of a hydrogen atom, an alkyl, an aryl, and aralkyl and an alkyl-aryl radical, and Z is selected from the group consisting of an oxygen atom and a sulfur atom.

* * * * *